(No Model.)
M. E. BLOOD.
ATTACHMENT FOR BICYCLES.
No. 521,132. Patented June 5, 1894.
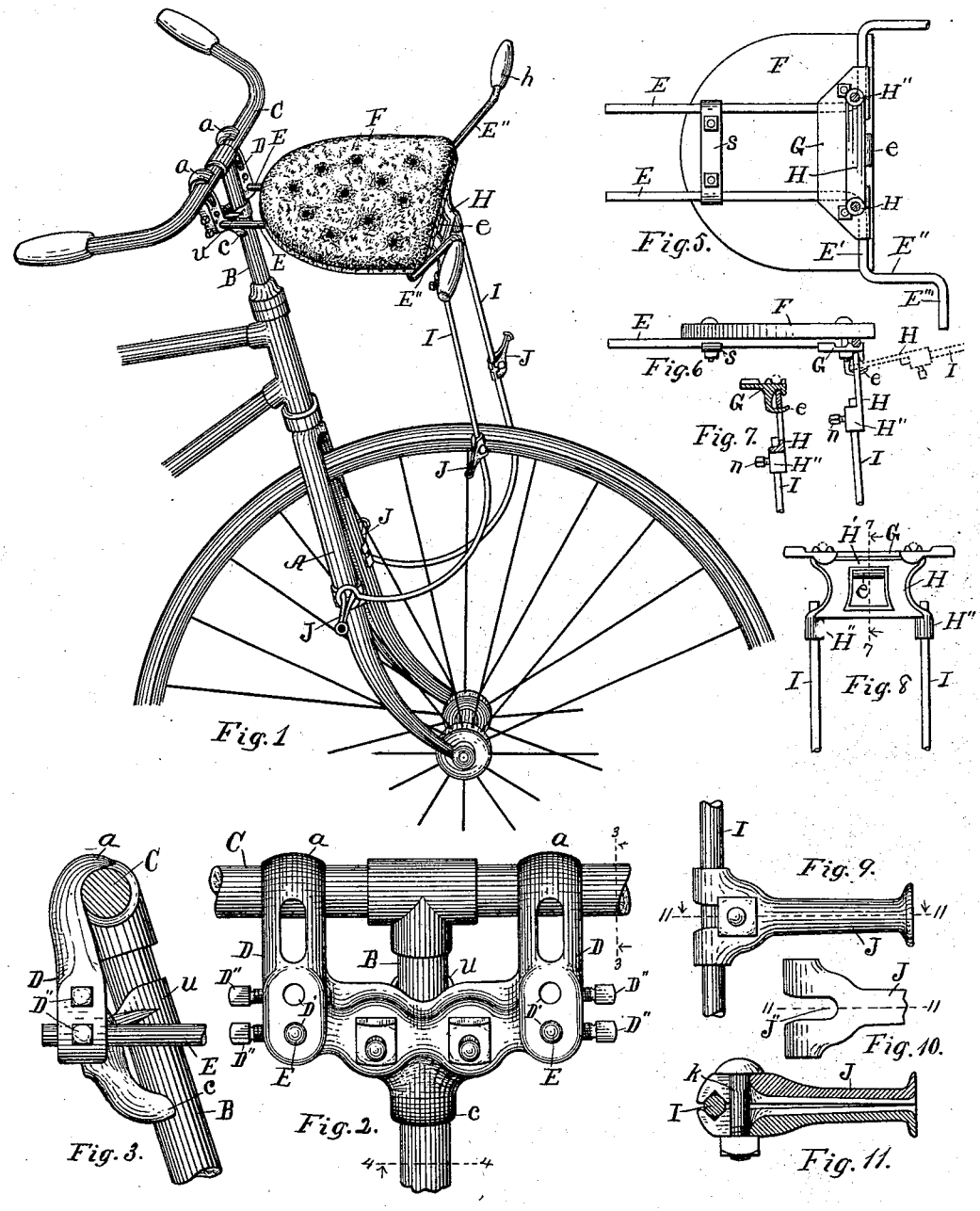
Witnesses:
Watter S. Wood
Hattie E. Card
Inventor.
Maurice E. Blood

UNITED STATES PATENT OFFICE.

MAURICE E. BLOOD, OF KALAMAZOO, MICHIGAN, ASSIGNOR TO THE KALAMAZOO CYCLE COMPANY, OF SAME PLACE.

ATTACHMENT FOR BICYCLES.

SPECIFICATION forming part of Letters Patent No. 521,132, dated June 5, 1894.

Application filed October 10, 1892. Serial No. 448,433. (No model.)

*To all whom it may concern:*

Be it known that I, MAURICE E. BLOOD, residing at Kalamazoo, in the county of Kalamazoo, State of Michigan, have invented a new and useful Improvement in Attachments for Bicycles, of which the following is a specification.

The object of this invention is to improve upon the devices shown in my United States Patent No. 480,760, dated August 16, 1892, and to furnish a simple and effectual means for attaching either this kind of a seat, a baby carrier, such as I show in my United States Patent No. 482,938, dated September 20, 1892, and other kinds of parcel or luggage carriers or anything that requires a good firm support on the handle bars of a bicycle. I attain these objects by the devices illustrated in the accompanying drawings, in which—

Figure 1 is a perspective view showing the devices attached to the forward part of a bicycle. Fig. 2 is an enlarged detail being a rear elevation of the devices for clamping to the handle-bar and handle-bar post and a broken section of such bars and post. Fig. 3 is an end elevation of Fig. 2. Fig. 4 is an enlarged detail, being an end view of the handle-bar post and showing the manner of applying the clip to said post. Fig. 5 is a detail showing the under side of the seat and manner of securing the parts that support the seat to it. Fig. 6 is a detail being a side elevation of Fig. 5 the dotted lines showing the front support for the seat in a position to be withdrawn from the seat. Fig. 7 is a detail being a side elevation of the devices for supporting the front part of the seat. Fig. 8 is a detail being a front elevation of Fig. 7. Fig. 9 is an enlarged detail, being a side elevation of the coasters, or foot-rest, as attached to a section of the seat forks. Fig. 10 is an enlarged detail showing one end of the foot-rest with the bolt removed, and Fig. 11 is an enlarged detail, being a sectional view of Fig. 9 on line 11—11.

A whole bicycle is not shown in the drawings, only enough—viz., the handle-bars, steering fork and head, and upper part of the front wheel to which the devices of this invention are attached—to show their relation to the bicycle.

Similar letters refer to similar parts throughout the several views.

The fork of the bicycle is designated by the letter A, the post by B, and the handle-bar by C.

D D is a bracket of metal, cast, forged, or made in any suitable manner and of a form to have three bearing points on the handle-bars and handle-bar post—viz., one bearing on the right handle-bar, and one on the left handle-bar and one on the handle-bar post; and a clip $u$ is used intermediate between these three bearing points to draw the bearing points against the handle-bars and post. I prefer to use a U-shaped clip to embrace the handle-bar post, and have the two ends of said clip pass through suitable holes in the bracket D D, and nuts on the ends of the clip to screw up against the bracket and bind it against the handle-bars and post. The clip $u$ might be made in the form of a hook to come only part way around the post, and have only one end pass through the bracket D D, or a part might be cast, or otherwise formed on the bracket D D to come around the opposite side of the post and be provided there with a set screw to push against the post to hold the bracket on. I prefer to have all three bearing points on the bracket D D made to come on the handle-bars and post on the same side and the binding clip or device to come between these three points but they might be made to have the bearing points on the handle-bars on one side while the bearing point on the post was on the opposite side and the clip or binding device lower down on the post bringing the bearing point of the bracket on the post intermediate between the bearing points on the handle-bar and the clamping device or clip $u$. The upper ends $a$ $a$ of the bracket D D are curved to come partly over the handle-bars to make the grip on the handle-bars more secure, and the bearing $c$ on the post is made forked, or with a recess $c'$ to secure it in the proper position on the post. The bracket D D is provided with holes D' D' to receive the seat rods E E or any other rods suitable for supporting carriers and other attachments to the bicycle and the set screws D'' D'' enter the holes D' D' from one side to secure the rods in their place. The bracket D D might be constructed in some other form, but I prefer the form shown as it will fit nearly any of the different makes of bicycles without interfering with the brakes. The seat rods E E are made first to have horizontal portions E and E' to come under the seat, the portion E' being bent at nearly right angles to the portion E and to extend out beyond the edge of the seat near one front corner of the seat and there the rods are bent upward to form the portion E" and lastly outward and nearly horizontally to form the portion E''' and handle part, and a suitable handle h can be put on this part. The rear ends of the seat rods E E go into the holes D' in the bracket D D and are secured there by the set screw D".

F is a seat and in this case is made flat and upholstered, but can be made in any other suitable manner. The bottom of the seat is a board, to which the upholstering is attached and is secured to the supporting rods E E by means of the plates s and G, which come over the rods E E opposite the seat-board F and are held in place and made to bind against the rods E E by means of suitable bolts passing through the plates and board. The plates s and G have suitable grooves on one side for the rods E E to go in. The plate G has at each end grooves to fit on both the portions E and E' of the seat rods, and when clamped on will hold the seat rods firmly in place and prevent them from turning or twisting. The lower part of this plate G has a hook e which is made to hook around the part H' of the fork head H, as shown in Figs. 6, 7 and 8. This part H' is made flat, with its upper edge adapted to fit in a groove in the lower side of the plate G when the fork-head H is turned at nearly right angles to the plate, or hanging down from said plate and the hook e will prevent the fork-head H from withdrawing from the plate G when in this position, but when the fork-head is turned forward in the position shown by the dotted lines in Fig. 6, it can then be withdrawn from the plate G.

The fork-head H is provided with suitable enlargements H" H" on its lower corners which have holes to receive the forks I I and the set screws n n will secure the forks in place.

The forks I I are made of spring wire, (similar to those in my Patent No. 480,760,) bowed down at the lower part and have eyes formed on their lower ends to go over the coasters of the bicycle. To fix them in place on the bicycle the seat part is first put in place with the rear ends of the rods E E secured in the bracket D D; then the forks and fork-head H are placed in the position shown by the dotted lines in Fig. 6. The lower ends of the forks are then dropped down under the coasters of the bicycle, and should be so adjusted by the set screw n in the head H that the eyes of the forks I I will be below the coasters about two inches; then these eyes are sprung upward and outward over the coasters, (the coasters going through the eyes) and left resting on the coasters. In this manner the whole device, seat and forks, will be under tension with all looseness taken out and will ride empty over rough roads without rattling.

The foot-rests, or coasters, J J are made in halves but could be united at their outer ends, each half is made nearly in the form of a Y and has a crease or groove across the forked part to fit on the forks I I or A A.

The bolt k is first laid in the opening J' of the fork of the step; then the halves of the step are placed one on each side of the fork it goes on and the bolt k tightened up.

Two or more sets of holes D' D' can be made in the bracket D D to admit of two or more devices being attached to the bracket at the same time, for instance, the seat as shown herein can be used and at the same time a parcel carrier or baby carrier can be set behind the handle-bars, or two parcel carriers can be used at the same time without a seat.

I am aware that attachments for carriers have been made to have two bearings on the handle-bars and one on the post; some of these are only wires bent around without any clamping device while others are clamped or bolted to the handle-bars but do not have any clamp that holds the bearing directly against the post. Such devices I do not claim.

The principal advantage in the manner in which I secure my bracket to the handle-bar and post is that one clamping device holds all three of the bearing points tight in their respective places, drawing one against the post as well as the other two against the handle-bars, and holds the bracket so it can be used to support the load either in front or behind the handle-bars, which most of the other devices will not do.

What I claim as new, and desire to secure by Letters Patent, is—

1. A bracket for a bicycle, having three bearing points, two to bear on the handle-bar on opposite sides of the handle-bar post and one to bear against the post, and a U-shaped clip to go around the post intermediate between the said three bearing points, the ends of the said clip passing through holes in the said bracket and provided with nuts suitable for clamping the said bracket to the handle-bars and post, substantially as and for the purposes specified.

2. The bracket D D having three bearing points to come against the handle-bar and post, the clip u for binding the bracket to the post and handle-bars and the holes D' D' and screws D" D" for receiving and holding bicycle attachments such as carriers, seats, &c., substantially as set forth.

3. The bracket D D having its upper ends a a curved over the handle-bar and its lower end c provided with a fork or groove c' to receive the post, and the clip u intermediate between the three points a a and c for binding the bracket to the post and handle-bars, the said bracket to receive and hold securely attachments such as carriers, seats, &c., substantially as shown.

4. In a child's seat for bicycles the bracket D D, clip u, seat F, and forks I I all arranged and for use substantially as specified.

5. In a child's seat for bicycles the rods E E for supporting the seat, the said rods having horizontal portions E E', upright or inclined portion E'' and horizontal portion E''' for handles substantially as and for the purposes specified.

6. A seat for bicycles having a support for its rear side on the handle-bar post and having a detachable support for its forward side, consisting of the rods I—I, adjustably connected to a head H, the head H adapted to be hooked or hinged to the forward part of the seat in such a manner that when the supporting rods I—I and head H are in a level or horizontal position, the head H can be withdrawn from the seat but when the rods I—I and head H are in a nearly vertical position the head H will be held securely to the forward part of the seat, substantially as and for the purposes specified.

7. In a seat for bicycles a support on the handle-bar post for the rear side of the seat, the front part of the seat being supported on rods extending up from the front fork A, in combination with the head H and plate G adapted to be hooked or hinged together, substantially as shown.

8. In a seat for bicycles a front support for the seat consisting of a plate G constructed substantially as shown with a hook e adapted to hook into a head H thereby forming a detachable hinge connection to connect the seat to the supporting rods I—I, for the purposes specified.

9. In a seat for bicycles the rods E—E for supporting the seat, the bracket D—D for receiving and holding the rear ends of the rods E—E and the plate G and board F for clamping and holding the rods E—E at the front part of the seat, the said plate G to have a hinge connection at the upper end of the supporting rods I—I, substantially as and for the purposes specified.

10. In combination with the forks of a bicycle the steps or coasters J formed substantially Y-shaped having grooves crosswise of their forks for the fork of the bicycle and the bottom of their forks adapted to receive the binding bolt k substantially as shown.

MAURICE E. BLOOD.

Witnesses:
CLARENCE C. BLOOD,
HATTIE E. CARD.